No. 708,801. Patented Sept. 9, 1902.
C. T. CUSTER.
CAN OPENER.
(Application filed Jan. 22, 1902.)

(No Model.)

WITNESSES
Elmer Leavey
James C. Babcock.

INVENTOR
Glenn T. Custer
by W. H. Babcock
Attorney

THE NORRIS PETERS CO., PHOTO-LITHO., WASHINGTON, D. C.

UNITED STATES PATENT OFFICE.

CLEMM T. CUSTER, OF GREAT CACAPON, WEST VIRGINIA.

CAN-OPENER.

SPECIFICATION forming part of Letters Patent No. 708,801, dated September 9, 1902.

Application filed January 22, 1902. Serial No. 90,762. (No model.)

*To all whom it may concern:*

Be it known that I, CLEMM T. CUSTER, a citizen of the United States, residing at Great Cacapon, in the county of Morgan and State of West Virginia, have invented certain new and useful Improvements in Can-Openers; and I do hereby declare the following to be a full, clear, and exact description of the invention, such as will enable others skilled in the art to which it appertains to make and use the same.

This invention relates to can-openers having a point that serves as a pivot and a cutting device or devices on a rod or bar rigid with said point, so that by turning the rod on said point as a pivot and bearing down on the said device the latter will cut the can.

The objects of this invention are to increase the simplicity and efficiency of such can-openers, to provide independent means for first penetrating and for afterward cutting the can, and to adapt these means to be adjusted independently of each other on the bar, so that they may be applied to different sizes of cans, the said devices acting successively at the same point, which may be selected at will.

To these ends my said invention consists in the construction and combination of parts hereinafter more particularly set forth and claimed.

Figure 1:
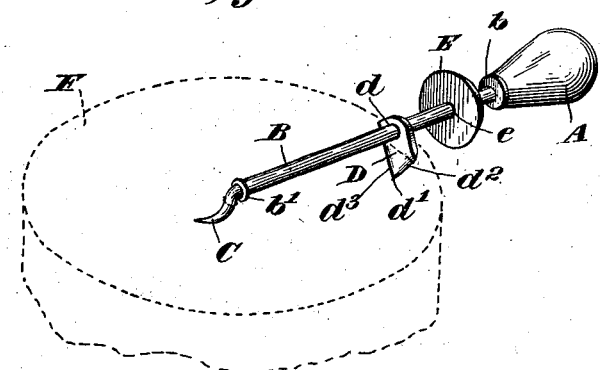
Figure 2:
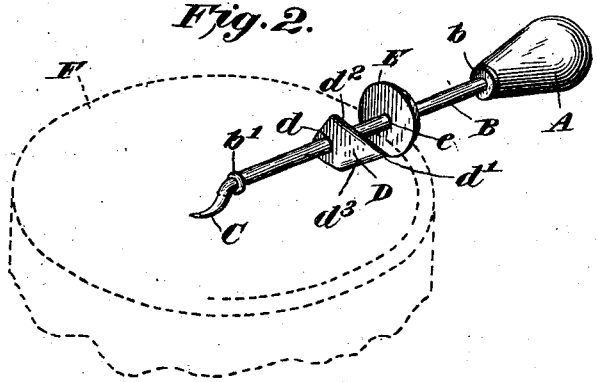
Figure 3:
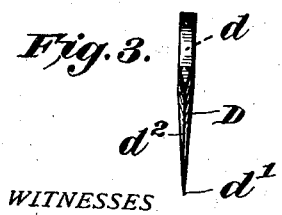
Figure 4:
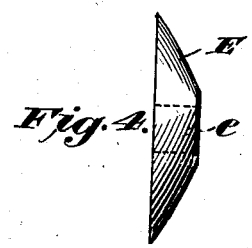

In the accompanying drawings, Figure 1 represents a perspective view of a can-opener embodying my invention in the act of perforating the top of a can, which is indicated by dotted lines. Fig. 2 represents a similar view of the same in the act of cutting the can-top. Figs. 3 and 4 represent detailed views of the puncturing device and the cutting-disk.

A designates the handle of the can-opener; B, the rod or bar forming its shank; C, the bent tapering point, which is first turned laterally from said bar or shank and then forward in a line parallel therewith, so as to present a point eccentric thereto which will serve as a pivot; D, the puncturing point or blade, and E the cutting-disk. The shank B is provided with a collar $b$ at the forward end of the said handle and with another collar $b'$ at the lateral bend of the point forming the forward end of the straight or main part of the shank. These collars being fixed serve as stops to limit the motion of the said blade and disk along the said shank in either direction and the collar $b$ also shields the said wooden handle A from being worn by the said disk. The blade D is approximately of a broad diamond shape with an opening $d$ near its upper corner of somewhat greater diameter than the said shank in order that it may slide along the same. The point $d'$ of this blade or puncturing device is presented downward when it is to be used, as shown in Fig. 1; but when said blade is out of use it may be turned in either direction, so that one of its two inclined lower faces $d^2 d^3$ may lie horizontally, or nearly so, on the top of the can and slide over the same without impeding the action of the tool. The cutting-disk E is provided with a central opening $e$ of about the same diameter as the opening $d$ aforesaid and for the same purpose. The forward face of this disk is flat, its rear face preferably convex for greater strength and efficiency in cutting. The radius of said disk is somewhat less than the distance from the center of the shaft B to the point $d'$, that said point may lie obliquely and not catch in the can. Its position is between the blade or puncturing device D and the collar $b$, which forms a facing for the wooden handle. These devices D and E are free to slide back and forth independently on the said shank, so that either may be adjusted to any distance from the point C, except as limited by the collars $b$ and $b'$, and either may also be moved to a point previously occupied by the other, the latter being first slipped out of the way.

The operation is as follows: The point C is pressed into the center of a can-top F, perforating the same. Said point catching in the material of said can-top then serves as a fulcrum and pivot. The puncturing device or blade D, having been moved along the shank B to a point slightly less distant from the pivotal point C and the radius of the said can-top, the can-opener is then brought down as a lever, forcing the point $d'$ of the said puncturing device through the can-top near its periphery. The sides $d^2 d^3$ are sharpened to form cutting edges, and their inclination is sufficiently great to puncture a rather long slot when depressed, as stated. The opener is then slightly raised and the said puncturing-blade thereby freed from the can-top. The said blade is then slid toward the point C and turned so as to present one of its edges $d^2$ or $d^3$ toward the can-top, the point $d'$ being thereby moved out of position for contact with the latter. The cutting-disk E is then moved forward along the shank to the point previously occupied by the said puncturing device or blade and the said shank is again lowered, so as to bring the edge of said disk into the slot made as aforesaid. The can-opener is then turned in a horizontal circle about the pivotal point C, which maintains its position in the puncture first made in the center of the can-top, the shank being in a higher plane than the said point and both it and the parallel part of said point slightly inclined upward and outward, while the said disk remains in the said slot and continually extends it as said circular motion goes on, so as to cut a disk out of the top of the can either wholly or partly, as may be desired. When the can-opener is to be used with a larger or smaller can, the puncturing device D is merely slipped out farther along the shaft or not so far, so as again to occupy a position close to the periphery of the can-top when brought down for puncturing, as aforesaid, the rest of the operation being as above described. In case it should be desired for any reason to cut only a small disk out of the center of the can-top or to cut any intermediate size less than substantially the entire top, this may obviously be effected by adjusting the position of the said puncturing-blade to the radius of the disk desired. By inserting the point C in the can-top at any point between the center and the periphery a disk eccentric to said top may be cut out as desired.

Of course this can-opener, though primarily intended for opening cans already filled and sealed, may be used in making holes for spouts and filling necks or for cutting disks from sheet metal or making holes therein for any purpose. Its convenience of adjustability, its simplicity, strength, and cheapness of manufacture make it desirable wherever thin sheet metal is to be cut to form holes or disks of varying diameter.

Having thus described my invention, what I claim as new, and desire to secure by Letters Patent, is—

1. In combination with the shank of the can-opener having a bent point which serves as a fulcrum and pivot, a puncturing device and a cutting device independently movable longitudinally on said shank in order that the said puncturing device may be set at any desired distance from the said point and the said cutting device afterward moved into the hole or slot made by said puncturing device, for the purpose of continuing the said slot in a circular path substantially as set forth.

2. A can-opener shank B provided with a handle A, the bent point C and a forward shoulder or stock $b'$ in combination with an arrow-head-form puncturing-blade D having a point $d'$ and edges $d^2$ $d^3$ and a cutting-disk E, both the said blade and the said disk being loosely sleeved on the said shank, permitting them to be independently adjusted longitudinally of the same or to turn around it substantially as and for the purpose described.

In testimony whereof I affix my signature in presence of two witnesses.

CLEMM T. CUSTER.

Witnesses:
IRVIN T. DAWSON,
R. EARLY DAWSON.